United States Patent
Kawai et al.

(10) Patent No.: US 7,492,066 B2
(45) Date of Patent: Feb. 17, 2009

(54) MACHINING APPARATUS

(75) Inventors: Tomohiko Kawai, Yamanashi (JP); Kenzo Ebihara, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 138 days.

(21) Appl. No.: 11/591,579

(22) Filed: Nov. 2, 2006

(65) Prior Publication Data
US 2007/0103262 A1  May 10, 2007

(30) Foreign Application Priority Data
Nov. 9, 2005  (JP) .............................. 2005-325052

(51) Int. Cl.
H02K 33/00 (2006.01)
H01F 7/00 (2006.01)

(52) U.S. Cl. ........................................ 310/15; 335/229
(58) Field of Classification Search .................. 310/15, 310/30; 335/296
See application file for complete search history.

(56) References Cited

U.S. PATENT DOCUMENTS

| | | | | | |
|---|---|---|---|---|---|
| 3,732,512 | A | * | 5/1973 | Puttick | ........................ 335/302 |
| 4,445,798 | A | * | 5/1984 | Munehiro | .................... 400/320 |
| 4,697,933 | A | * | 10/1987 | Morita | ......................... 384/12 |
| 5,571,284 | A | * | 11/1996 | Kawamichi et al. | .......... 400/322 |
| 6,399,008 | B1 | | 6/2002 | Nakazawa et al. | |
| 6,747,750 | B1 | * | 6/2004 | Fangmeyer | .................. 358/1.1 |
| 6,812,583 | B2 | * | 11/2004 | Cheung et al. | ............... 290/1 R |
| 7,239,050 | B2 | * | 7/2007 | Miyamoto | .................... 310/12 |
| 2001/0025411 | A1 | * | 10/2001 | Probst | .......................... 29/740 |
| 2004/0086351 | A1 | * | 5/2004 | Kim et al. | ................... 409/235 |
| 2005/0028657 | A1 | * | 2/2005 | Mitro et al. | .................... 82/118 |
| 2008/0001484 | A1 | * | 1/2008 | Fuller et al. | ..................... 310/15 |

FOREIGN PATENT DOCUMENTS

| | | |
|---|---|---|
| EP | 0 287 786 | 10/1988 |
| JP | 5-238093 | 9/1993 |
| JP | 7-137935 | 5/1995 |
| JP | 2742223 | 10/1998 |
| JP | 2000-94774 | 4/2000 |
| JP | 2005-169523 | 6/2005 |
| JP | 2005-268335 | 9/2005 |

OTHER PUBLICATIONS

Notice of Reasons for Rejection issued in corresponding Japanese Patent Application No. 2005-325052, mailed on Aug. 21, 2007.
European Search Report in corresponding Patent Application No. 06022518.2-1262 dated Mar. 28, 2007.
XP002424116, Database WPI, Section Ch, Week 198232, Derwent Publications Ltd., London, GB; p. 55, AN 1982-67753e, Buzhenetskij et al.
XP002424117, Database WPI, Section Ch, Week 199626, Derwent Publications Ltd., London, GB; p. 55, AN 1996-254415, Fujimoto et al.

* cited by examiner

Primary Examiner—Elvin G Enad
Assistant Examiner—Alexander Talpalatskiy
(74) Attorney, Agent, or Firm—Staas & Halsey LLP

(57) ABSTRACT

A sliding member having an attached tool reciprocates along a guide member. Permanent magnets are placed at both ends of the reciprocating motion path of the sliding member and permanent magnets are also placed in positions on the guide member that correspond to stroke ends of the sliding member. At the points at which the motion of the sliding member reverses, the permanent magnets approach one another and generate a repulsive force, thereby accelerating the sliding member.

7 Claims, 1 Drawing Sheet

MACHINING APPARATUS

BACKGROUND OF THE INVENTION

1. Field of the Invention

The present invention relates to a machining apparatus that performs linear grooving.

2. Description of the Related Art

To machine a diffraction grating or a die for the light guide plate of a liquid crystal display, hundreds to tens of thousands of linear grooves need to be formed. To reduce the time for machining this many linear grooves, a machining apparatus with a high speed feed axis is required. Even minor errors are intolerable in the machining of a diffraction grating or a die for a light guide plate, so a smooth linear motion mechanism that does not generate vibration even when driven at high speed is also necessary. A known feed mechanism that can achieve the necessary high speed and high precision machining has a structure combining an air bearing and a linear motor.

To reciprocate a linear axis at high speed, great thrust force is necessary to reverse its motion. Solutions to this problem were proposed for printers in Japanese Patent Applications Laid-Open No. 5-238093 and No. 2000-94774. In the printers according to these inventions, a shuttle mechanism having a printing head is reciprocated by a linear motor. The linear motor comprises permanent magnets disposed on the printer body and a coil disposed on the shuttle mechanism facing the array of permanent magnets. To reduce the force required by the driving unit at reversal points in the reciprocating motion of the shuttle mechanism, additional permanent magnets are placed at both ends of the array of the permanent magnets. When the reciprocating motion of the shuttle mechanism reverses, an attractive force is generated between the base plate on which the coil is mounted on the shuttle mechanism and the permanent magnets at the ends of the array of permanent magnets, acting to make the shuttle mechanism return to the center of the reciprocating motion. The thrust force required from the linear motor is thereby reduced.

In addition, in a guided continuous reciprocating apparatus that continuously moves or reciprocates an elongate member such as a cable or metal wire, Japanese Patent Application Laid-Open No. 7-137935 proposes a solution in which elastic springs or other objects are placed at both ends of the path of motion of a moving body to store the inertial energy of the moving body and the stored inertial energy is reversed and imparted to the moving body when its motion reverses, so that the driving means that drives the moving body has to produce less thrust force to reverse the motion of the moving body.

A body undergoing reciprocating motion must be strongly accelerated at the points at which its motion reverses. In particular, when the moving body reciprocates at high speed, the high acceleration at the reversal points causes the driving means that drives the moving body to generate a large amount of heat, which affects machining precision. As described above, even small errors are intolerable in the machining of a diffraction grating or a die for a light guide plate, so heat generation from the driving unit needs to be minimized. In addition, if a linear motor is used as the driving unit to obtain high thrust force, thrust ripples and cogging occur, affecting straightness accuracy.

SUMMARY OF THE INVENTION

An object of the present invention is to provide a machining apparatus that performs machining with a high speed reciprocating motion, solves the above problems, and is capable of reducing the force required from the driving unit to drive the reciprocating body when its motion reverses.

A machining apparatus according to the present invention has a linear driving unit that includes a sliding member to which a tool is attachable and a guide member that supports the sliding member in a linearly movable manner via a bearing. The machine apparatus further comprises a mechanism that generates thrust force between the guide member and the sliding member that constitute the linear driving unit, first permanent magnets placed at both ends of a linear motion path of the sliding member, and second permanent magnets placed in positions on the guide member that correspond to both ends of the stroke of the reciprocating motion of the sliding member with respect to the guide member. When, in the reciprocating motion of the sliding member with respect to the guide member, the sliding member is positioned at one or another end of the stroke, the first permanent magnets are proximate the second permanent magnets, and the first and second permanent magnets repel one another, exerting a repulsive force in the sliding member in an axial direction of the guide member.

The guide member may be supported by a base of the machining apparatus via another bearing so that the guide member and the sliding member are movable coaxially.

The bearing may be a fluid dynamic bearing.

A linear motor disposed between the guide member and the sliding member may be used as the mechanism for generating thrust force. In this case, a driving coil may be provided on the sliding member, driving permanent magnets may be placed in positions on the guide member that correspond to both ends of the stroke of the reciprocating motion of the sliding member with respect to the guide member, the coil and the driving permanent magnets constituting the linear motor, and the driving permanent magnets may be positioned to reinforce the magnetic force of the second permanent magnets disposed on the guide member.

The first permanent magnets may be placed on the sliding member and the second permanent magnets may be placed on the guide member so that the directions of their magnetic poles are orthogonal to the axial direction of the guide member.

The sliding member may have a means for changing the cutting depth of the tool with respect to a workpiece. A piezoelectric device may be used as the means of changing the cutting depth. The machining apparatus may also have a control means for performing unidirectional grooving on the workpiece by controlling the means for changing the cutting depth so that it advances the tool when the sliding member moves on its forward path, and retracts the tool when the sliding member moves on its backward path.

In the machining apparatus structured as above according to the present invention, the sliding member receives repulsive force from the reversing permanent magnets at a motion reversal. Accordingly, the mechanism (linear driving unit) for generating thrust force between the guide member and the sliding member has only to generate a small force; this avoids heat generation and prevents a reduction in machining precision due to heat. A linear motor having permanent magnets placed at the ends (where thrust force is small) of the stroke of the sliding member can be used as the mechanism for generating thrust force. This prevents occurrence of thrust ripples or cogging and enables high speed and high precision linear movement and linear grooving. In addition, the fluid dynamic bearing does not transfer vibration, thereby enabling high precision machining.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
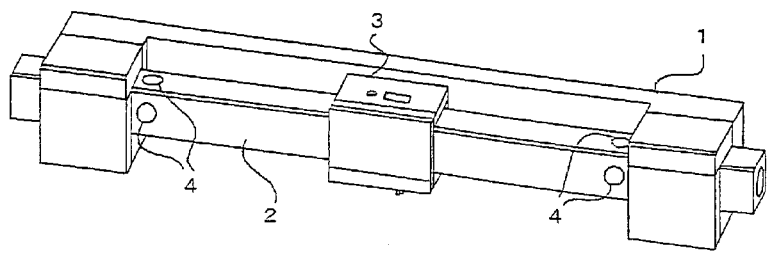
FIG. 1 is a perspective view showing the main elements of a machining apparatus embodying the present invention.
Figure 2:
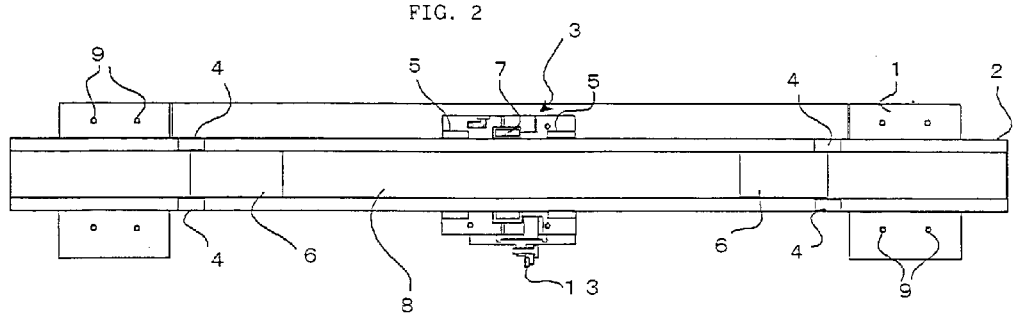
FIG. 2 is a sectional view with the machining apparatus in FIG. 1 cut along an axial direction of a guide material.

The base 1 in FIG. 1 is secured to a machining apparatus (not shown) in a prescribed position. A guide member 2 is supported at both ends by the base 1 via a fluid dynamic bearing (air bearing). Accordingly, air piping 9 is disposed in the base 1 as shown in FIG. 2, and compressed air led through the air piping 9 is expelled onto a surface of the guide member 2 facing the base 1, so that the air pressure constitutes the fluid dynamic bearing that supports the guide member 2.

Figure 3:
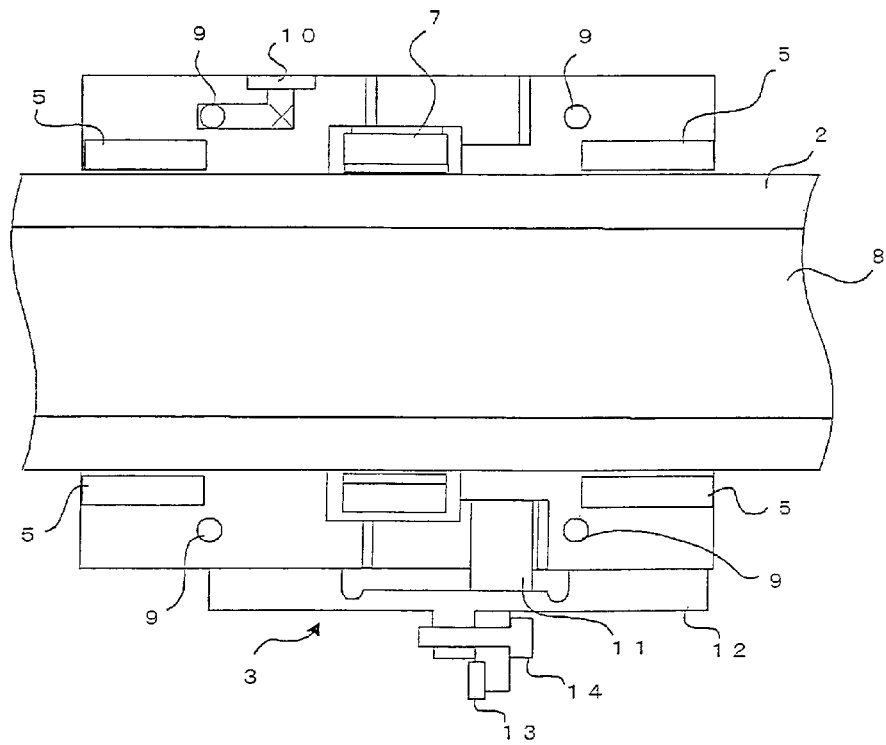
FIG. 3 is an enlarged sectional view of the sliding member in FIG. 2.

A sliding member 3 is supported by the guide member 2 via a fluid dynamic bearing and is movable in the axial direction of the guide member 2. Accordingly, an air inlet 10 and the piping 9 that communicates with the air inlet 10 are disposed in the sliding member 3 as shown in FIG. 3. Compressed air led to the air piping 9 is expelled onto a facing surface of the guide member 2, so that the sliding member 3 is supported by the air pressure. The sliding member 3 and the guide member 2 move coaxially, that is, on the same axis line.

In this embodiment, a linear motor is disposed between the sliding member 3 and the guide member 2 to operate as the thrust force generation means of a linear driving unit. In the example in FIG. 2, a coil 7 is placed on the sliding member 3 and an iron core 8 and driving permanent magnets 6 are placed on the guide member 2 so that the coil 7, the iron core 8, and the driving permanent magnets 6 constitute a linear motor. In this embodiment, the driving permanent magnets 6 are placed in particular positions on the guide member 2 that correspond to the two ends of the stroke of the reciprocating motion of the sliding member 3 with respect to the guide member 2. The iron core 8 is disposed in the guide member 2 between the two driving permanent magnets 6.

Reversing permanent magnets 4 are placed near the outer end of one driving permanent magnet 6 (the end distant from the other driving permanent magnet 6) and near the outer end of the other driving permanent magnet 6 (the end distant from the one driving permanent magnet 6).

The guide member 2 has four sides along its axial direction, so a total of four reversing permanent magnets 4 (one for each side of the guide member 2) are attached at each position in the axial direction (in FIG. 1, only two of four reversing permanent magnets 4 are shown at each end of the guide member 2 in the axial direction.) The magnetic poles of each reversing permanent magnet 4 are oriented in a direction orthogonal to the axial direction of the guide member 2. Further, as the surface of each of the permanent magnets 4 is flush with the surface of the guide member 2, the surface of the permanent magnet 4 constitutes a part of a bearing surface.

The coil 7 is placed at the center of the sliding member 3 so as to face the opposing surface of the guide member 2 as shown in FIG. 3. Reversing permanent magnets 5 are placed on both sides of the sliding member 3 in its direction of motion, or on both sides of the coil 7, so as to face the opposing surface of the guide member 2. These reversing permanent magnets 5 are placed so that their magnetic poles are oriented in a direction orthogonal to the direction of motion of the sliding member 3, and so that they are repelled by the reversing permanent magnets 4 on the guide member 2. Those reversing permanent magnets 4 are placed near the driving permanent magnets 6, so the magnetic force of the reversing permanent magnets 4 is reinforced by the driving permanent magnets 6. Further, in this embodiment, as the reversing permanent magnet 4 and the reversing permanent magnet 5 are configured not to touch each other, damage of the permanent magnets 4 and 5 will not occur.

An elastic member 12 such as a blade spring is attached to the sliding member 3, as shown in FIG. 3. A tool 13 for grooving a workpiece (not shown) is attached to the elastic member 12 with a screw 14. A piezoelectric device 11 is placed between the elastic member 12 and the sliding member 3. A control means (not shown) drives the piezoelectric device 11 to expand or compress it so that the tool 13 is advanced or retracted via the elastic member 12 to change the grooving depth in the workpiece. That is, the piezoelectric device 11 is used as a means for adjusting the cutting depth of the tool 13 in the workpiece.

The linear motor is driven by current passing through the coil 7 disposed on the sliding member 3 in order to move the sliding member 3 in one direction. When the sliding member 3 reaches the end position of its reciprocating stroke, the direction of current flow through the coil 7 is changed and the sliding member 3 reverses its direction of motion.

Immediately before a reversal of the motion of the sliding member 3, the reversing permanents magnets 5 disposed on the sliding member 3 become proximate to the reversing permanent magnets 4 disposed on the guide member 2, so the repulsive force generated between the permanent magnets 4 and 5 significantly decelerates the sliding member 3. After that, the sliding member 3 receives force in the opposite direction and is accelerated in the opposite direction.

Since the sliding member 3 is accelerated by the repulsive force acting between the reversing permanent magnets 4 and 5, a linear motor with a small thrust force, which has driving permanent magnets 6 disposed only at the ends of the stroke of the sliding member 3, can machine a workpiece by driving the tool 13.

In this embodiment, the stroke of the reciprocating motion of the tool 13 (sliding member 3) is restricted to the distance between the first group of reversing permanent magnets 4 and the second group of reversing permanent magnets 4, so the length of the stroke is fixed, but the energy needed for the reciprocating motion is partly provided by the reversing permanent magnets 4 and 5, so machining can be performed efficiently, with less driving energy.

The driving permanent magnets 6 constituting the linear motor are placed in positions on the guide member 2 that correspond to both ends of the stroke of the reciprocating motion of the sliding member 3 with respect to the guide member 2, so no thrust ripples or cogging is generated and the linear motor can operate as a high precision linear motion driving means, thereby enabling high precision grooving.

In addition, because the guide member 2 is supported by the base 1 by a fluid dynamic bearing, repulsive force or the like received by the guide member 2 when, for example, the motion of the sliding member 3 reverses is not transferred to the base 1 and the workpiece, thereby preventing vibration. As a result, the precision of the machining process executed by the reciprocating motion of the sliding member 3 can be improved.

As described above, the machining apparatus in this embodiment reciprocates the sliding member 3 with respect to the guide member 2 by changing the direction of current flowing through the coil 7 disposed on the sliding member 3. The control means for driving and controlling the piezoelectric device 11 expands or compresses the piezoelectric device 11 to adjust the cutting depth of the tool 13 during the reciprocating motion of the sliding member 3. For example, when the sliding member 3 moves on its forward path, prescribed current is passed through the piezoelectric device to expand the piezoelectric device, the tool 13 is moved to a prescribed cutting depth, and grooving of the workpiece is performed. When the sliding member 3 moves on its backward path, the piezoelectric device 11 is compressed to retract the tool 13 so as not to interfere with the workpiece. The control means (not shown) moves the workpiece in a relative direction orthogonal to the direction of the reciprocating motion of the sliding member 3 and grooving is performed as described above. The cutting depth of the tool 13 is controlled by a voltage applied to the piezoelectric device 11.

The invention claimed is:

1. A machining apparatus having a linear driving unit including a sliding member to which a tool is attachable and a guide member that supports the sliding member in a linearly movable manner, wherein the guide member is supported by a base of the machining apparatus via a bearing so that the guide member and the sliding member are movable coaxially, the machining apparatus comprising:

a mechanism generating thrust force between the guide member and the sliding member wherein a linear motor disposed between the guide member and the sliding member is used as the mechanism generating the thrust force;

first permanent magnets attached to the sliding member at both ends of a linear motion path of the sliding member; and second permanent magnets placed in positions on the guide member that correspond to both ends of a stroke of a reciprocating motion of the sliding member with respect to the guide member, wherein the magnetic poles of said first permanent magnets and the magnetic poles of said second permanent magnets are oriented in a direction orthogonal to the axial direction of said guide member;

wherein, in the reciprocating motion of the sliding member with respect to the guide member, when the sliding member is positioned at one end or another end of the stroke of its reciprocating motion, the first permanent magnets are proximate the second permanent magnets, and the first and second permanent magnets repel one another, exerting a repulsive force on the sliding member acting in an axial direction of the guide member;

wherein a driving coil is provided on the sliding member;

wherein driving permanent magnets are placed in positions on the guide member that correspond to both ends of the stroke of the reciprocating motion of the sliding member with respect to the guide member; and wherein the coil and the driving permanent magnets constitute the linear motor.

2. The machining apparatus according to claim 1, wherein the bearing is a fluid dynamic bearing.

3. The machining apparatus according to claim 1, wherein: the driving permanent magnets are positioned to reinforce a magnetic force of the second permanent magnets disposed on the guide member.

4. The machining apparatus according to claim 1, wherein the sliding member has means for changing a cutting depth of the tool with respect to a workpiece.

5. The machining apparatus according to claim 4, wherein a piezoelectric device is used as the means for changing the cutting depth.

6. The machining apparatus according to claim 4, further comprising control means for performing unidirectional grooving on the workpiece by controlling the cutting depth change means, advancing the tool when the sliding member moves on a forward path, and retracting the tool when the sliding member moves on a backward path.

7. The machining apparatus according to claim 1, wherein each of said second permanent magnets placed on the guide member is flush with the guide member.

* * * * *